US011461027B2

(12) United States Patent
Gupta et al.

(10) Patent No.: US 11,461,027 B2
(45) Date of Patent: Oct. 4, 2022

(54) DEDUPLICATION-AWARE LOAD BALANCING IN DISTRIBUTED STORAGE SYSTEMS

(71) Applicant: VMware, Inc., Palo Alto, CA (US)

(72) Inventors: Abhishek Gupta, Sunnyvale, CA (US); Jorge Guerra Delgado, Fremont, CA (US); Sandeep Rangaswamy, Mountain View, CA (US); Srinath Premachandran, Fremont, CA (US); Pascal Renauld, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 290 days.

(21) Appl. No.: 15/653,249

(22) Filed: Jul. 18, 2017

(65) Prior Publication Data

US 2019/0026042 A1   Jan. 24, 2019

(51) Int. Cl.
*G06F 16/21*   (2019.01)
*G06F 3/06*    (2006.01)
*G06F 16/215*  (2019.01)

(52) U.S. Cl.
CPC .......... *G06F 3/0641* (2013.01); *G06F 3/0608* (2013.01); *G06F 3/0635* (2013.01); *G06F 16/215* (2019.01); *G06F 16/217* (2019.01); *G06F 3/067* (2013.01)

(58) Field of Classification Search
CPC ........................... G06F 16/1748; G06F 3/0641
See application file for complete search history.

(56) References Cited

U.S. PATENT DOCUMENTS

| | | | | |
|---|---|---|---|---|
| 8,538,933 B1* | 9/2013 | Hu | ......................... | G06F 3/0689 707/700 |
| 8,539,148 B1* | 9/2013 | Chen | ..................... | G06F 3/0641 711/112 |
| 8,751,763 B1* | 6/2014 | Ramarao | ............. | G06F 16/1752 711/162 |
| 8,805,796 B1* | 8/2014 | Hu | ......................... | G06F 3/0641 707/692 |
| 9,298,726 B1* | 3/2016 | Mondal | ................. | G06F 3/0608 |
| 9,448,927 B1* | 9/2016 | Agarwala | ........... | G06F 12/0811 |
| 9,946,486 B1* | 4/2018 | Clifford | ................... | G06F 3/067 |
| 10,515,009 B1* | 12/2019 | Wallace | ................... | G06F 3/067 |

(Continued)

*Primary Examiner* — Mohammad S Rostami (57) ABSTRACT

Techniques for enabling deduplication-aware load balancing in a distributed storage system are provided. In one set of embodiments, a node of the distributed storage system can receive an I/O (Input/Output) request pertaining to a data block of a storage object stored on a local storage component of the node. The node can further determine whether the I/O request requires insertion of a new entry into a deduplication hash table associated with the local storage component or deletion of an existing entry from the deduplication hash table. If the I/O request requires insertion of a new hash table entry, the node can add an identifier of the data block into a probabilistic data structure associated with the local storage component, where the probabilistic data structure is configured to maintain information regarding distinct data blocks that are likely present in the local storage component. Alternatively, if the I/O request requires deletion of an existing hash table entry, the node can remove the identifier of the data block from the probabilistic data structure.

27 Claims, 6 Drawing Sheets

(56) References Cited

U.S. PATENT DOCUMENTS

| | | | |
|---|---|---|---|
| 2009/0327625 A1* | 12/2009 | Jaquette | G06F 3/0608 711/160 |
| 2011/0231362 A1* | 9/2011 | Attarde | G06F 11/3442 707/609 |
| 2011/0307447 A1* | 12/2011 | Sabaa | H04L 67/2842 707/637 |
| 2013/0036278 A1* | 2/2013 | Strzelczak | G06F 3/0608 711/161 |
| 2013/0091102 A1* | 4/2013 | Nayak | G06F 3/067 707/E17.044 |
| 2013/0159261 A1* | 6/2013 | Dewey | G06F 16/1748 707/692 |
| 2013/0218847 A1* | 8/2013 | Saika | G06F 16/182 707/692 |
| 2015/0227543 A1* | 8/2015 | Venkatesh | G06F 16/119 707/620 |
| 2015/0261776 A1* | 9/2015 | Attarde | G06F 3/0641 707/664 |
| 2015/0261792 A1* | 9/2015 | Attarde | G06F 16/215 707/616 |
| 2016/0267138 A1* | 9/2016 | Jadhav | H04L 47/762 |
| 2016/0306822 A1* | 10/2016 | Waghulde | G06F 12/0246 |
| 2016/0350006 A1* | 12/2016 | Wang | G06F 3/067 |
| 2017/0010809 A1* | 1/2017 | Hironaka | G06F 3/0665 |
| 2017/0031768 A1* | 2/2017 | Sarah | G06F 16/1748 |
| 2017/0090814 A1* | 3/2017 | Yeung | G06F 3/0638 |
| 2017/0177266 A1* | 6/2017 | Doerner | G06F 12/0261 |
| 2017/0192860 A1* | 7/2017 | Vijayan | G06F 3/0619 |
| 2017/0293649 A1* | 10/2017 | Finlay | G06F 16/2282 |
| 2018/0067660 A1* | 3/2018 | Yamamoto | G06F 3/0635 |
| 2018/0188971 A1* | 7/2018 | Palangappa | G06F 3/0679 |
| 2018/0349053 A1* | 12/2018 | Battaje | G06F 12/0891 |
| 2018/0364949 A1* | 12/2018 | Aston | G06F 3/061 |
| 2019/0107953 A1* | 4/2019 | Garg | G06F 3/067 |
| 2021/0042327 A1* | 2/2021 | Jia | G06F 17/18 |

* cited by examiner

DEDUPLICATION-AWARE LOAD BALANCING IN DISTRIBUTED STORAGE SYSTEMS

BACKGROUND

In a distributed storage system, data is stored across a number of nodes that each includes a set of physical storage resources (e.g., magnetic disk(s), solid state disk(s), etc.). The distributed storage system aggregates the per-node physical storage resources into a single, logical storage pool. This logical storage pool is then made available to various clients (e.g., applications, virtual machines (VMs), etc.) for carrying out storage operations.

Some distributed storage systems implement a load balancing mechanism that moves data across nodes on a periodic basis. The general goal of this load balancing mechanism is to ensure that the storage utilization of any given node does not exceed a threshold (for, e.g., performance or other reasons). Unfortunately, in scenarios where a distributed storage system also implements data deduplication (i.e., a process by which duplicate copies of data are eliminated from storage), existing load balancing implementations generally fail to take into account what data is deduplicated on the system's nodes at the time of making a load balancing decision. This can result in suboptimal storage utilization in the overall system.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

1. Overview

The present disclosure describes techniques that enable a distributed storage system to perform load balancing in a manner that is "deduplication-aware"—in other words, in a manner that takes into account what deduplicated data is present on the various nodes of the system at the time of deciding which node will act as the target for a load balancing operation.

Generally speaking, these techniques can ensure that a given storage object is rebalanced to a target node that has the greatest number of duplicated data blocks for the object already present in its local storage. Thus, these techniques can optimize the overall storage utilization of the system by avoiding the need to create a completely new copy of the object at the target node (instead, the system need only create/allocate those object data blocks that are not already present on the target node). These techniques can also accelerate the load balancing operation by reducing the amount of data that needs to be transferred from the source to target node.

The foregoing and other aspects of the present disclosure and described in further detail in the sections that follow.

2. System Architecture

Figure 1:
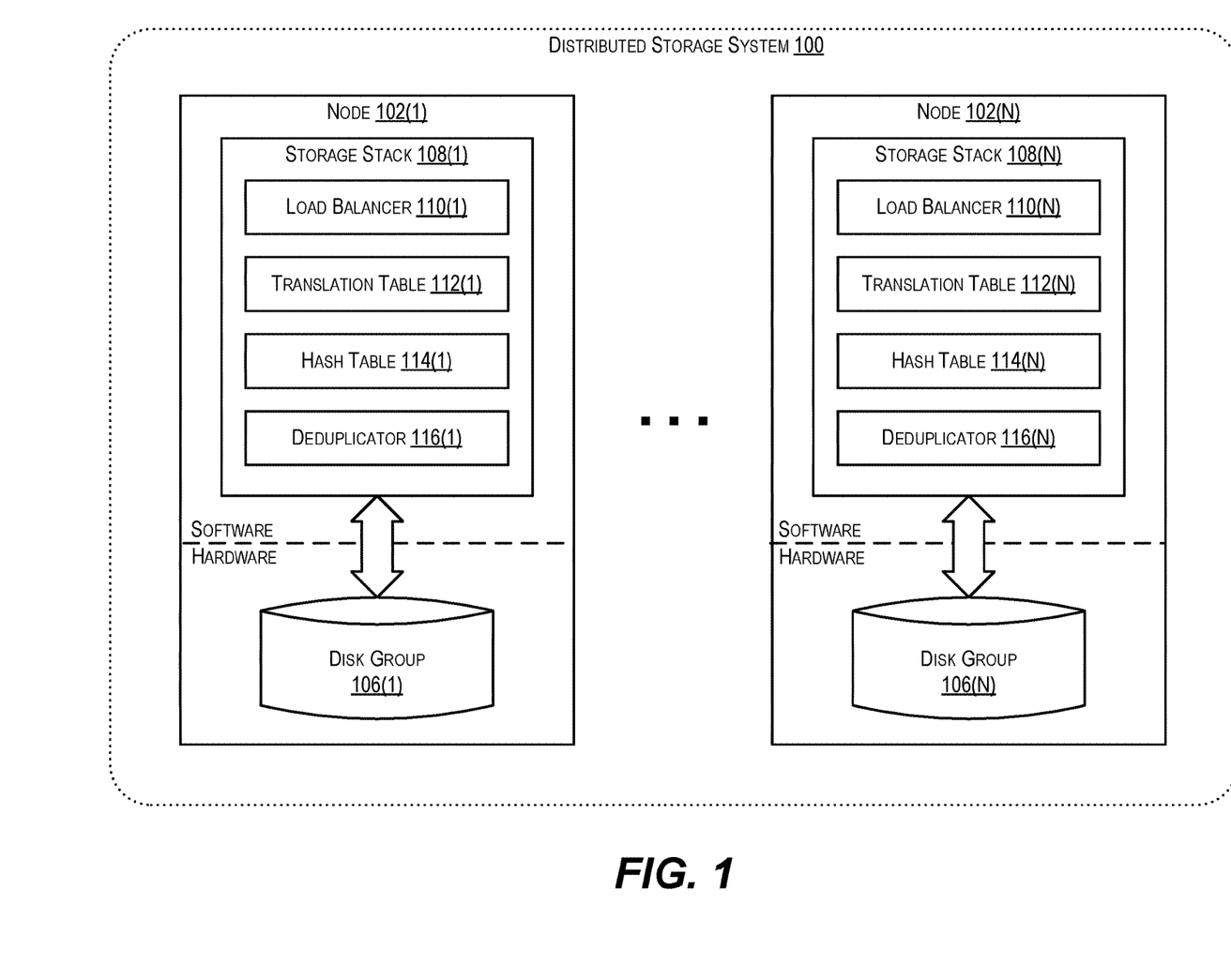
FIG. 1 depicts a distributed storage system according to an embodiment.

FIG. 1 depicts a distributed storage system 100 in which embodiments of the present disclosure may be implemented. Distributed storage system 100 includes a number of nodes 102(1)-(N) that are interconnected via a network (not shown). Each node 102 includes a set of local storage resources (referred to as a disk group 106) that comprises one or more physical storage devices, such as magnetic disks, solid state disks (SSDs), etc. Each node 102 also includes a storage stack 108 that is responsible for managing interactions between the system's storage resources and storage clients or other external entities. For example, storage stacks 108(1)-(N) can work in concert to aggregate and present disk groups 106(1)-(N) as a single, logical storage pool to storage clients. Storage stacks 108(1)-(N) can further process I/O requests received from those clients and can communicate with each other to ensure that the requests are properly routed to the node(s) storing the data associated with the requests.

In one set of embodiments, each node 102 may be a general purpose computer system/server and storage stack 108 may be implemented in software. For example, in a particular embodiment, each node 102 may be a host system in a virtualized computing deployment and storage stack 108 may be part of the host system's hypervisor. In this case, distributed storage system 100 can be considered an instance of a hyper-converged software-defined storage system, such as systems implementing VMware Inc.'s vSAN technology. In other embodiments, each node 102 may be a specialized storage appliance and storage stack 108 may be implemented partially or entirely in hardware.

In the example of FIG. 1, distributed storage system 100 is configured to perform load balancing of data across nodes 102(1)-(N). To that end, storage stack 108 of each node 102 includes a load balancer module 110. Load balancer 110 can, in response to detecting a trigger condition (e.g., utilization of disk group 106 beyond a predefined threshold), identify one or more one storage objects that can be offloaded from the current (i.e., "source") node in order to reduce the current node's storage utilization. As used herein, a "storage object" can be a file, a logical disk, a volume, or any other logical grouping of data understood by distributed storage system 100. Load balancer 110 can then select one or more target nodes on which the identified storage object(s) can be placed and can move the storage object(s) from the current node to the selected target node(s) (thereby freeing the storage space consumed by those object(s) on the disk group of the current node).

In addition to load balancing, distributed storage system 100 is configured to perform deduplication of data that is written by storage clients. To that end, storage stack 108 of each node 102 includes a deduplication translation table 112, a deduplication hash table 114, and a deduplicator module 116. Translation table 112 can maintain, for each data block written by storage clients, a mapping between (1) a logical offset for the data block in a logical storage address space of distributed storage system 100 and (2) a physical offset in a particular storage device of disk group 106 where the data block is actually stored. Hash table 114 can maintain, for each physical data block stored in disk group 106, an entry that identifies (1) the physical offset of the data block, (2) a fingerprint (e.g., hash) of the content of the data block, and (3) a reference count of the number of logical data blocks that point to this physical data block.

In response to a write request for a particular data block B, deduplicator 116 can calculate a fingerprint F of the content of B and check whether F exists in hash table 114. If so, deduplicator 116 can conclude that there is no need to write B to disk group 106 (since a deduplicated copy of B already exists there per the hash table); instead, deduplicator 116 can simply increase the reference count of the hash table entry and add a new mapping in translation table 112 that causes the logical offset of B to point to the physical offset of the existing deduplicated copy. On the other hand, if F cannot be found in hash table 114, deduplicator 116 can conclude that a copy of B has not yet been stored in disk group 106. As a result, deduplicator 116 can allocate new physical storage space (i.e., a new physical offset) for B in disk group 106, insert a new entry into hash table 114 that includes the newly allocated physical offset, fingerprint F, and a reference count of 1, and insert a new mapping into translation table 112 that maps the logical offset for B to the new physical offset.

Further, in response to a request to delete a particular data block B, deduplicator 116 can find the entry for B in hash table 114 and check the reference count of the entry. If the reference count is greater than 1 (indicating that there are other objects pointing to this block in storage), deduplicator 116 can decrement the reference count while leaving the hash table entry in place and can delete the corresponding entry for B in translation table 112. On the other hand, if the reference count is exactly 1 (indicating that there are no other objects pointing to this block in storage), deduplicator 116 can mark the physical offset for B in storage as free/empty and delete the entries for B from both the hash and translation tables.

As noted the Background section, existing distributed storage systems that implement both load balancing and data deduplication perform their load balancing operations in a manner that is agnostic of (i.e., does not consider) how data is deduplicated across system nodes. While this approach achieves the goal of balancing per-node storage usage, in certain scenarios it can result in suboptimal storage utilization for the overall system.

Figure 2:
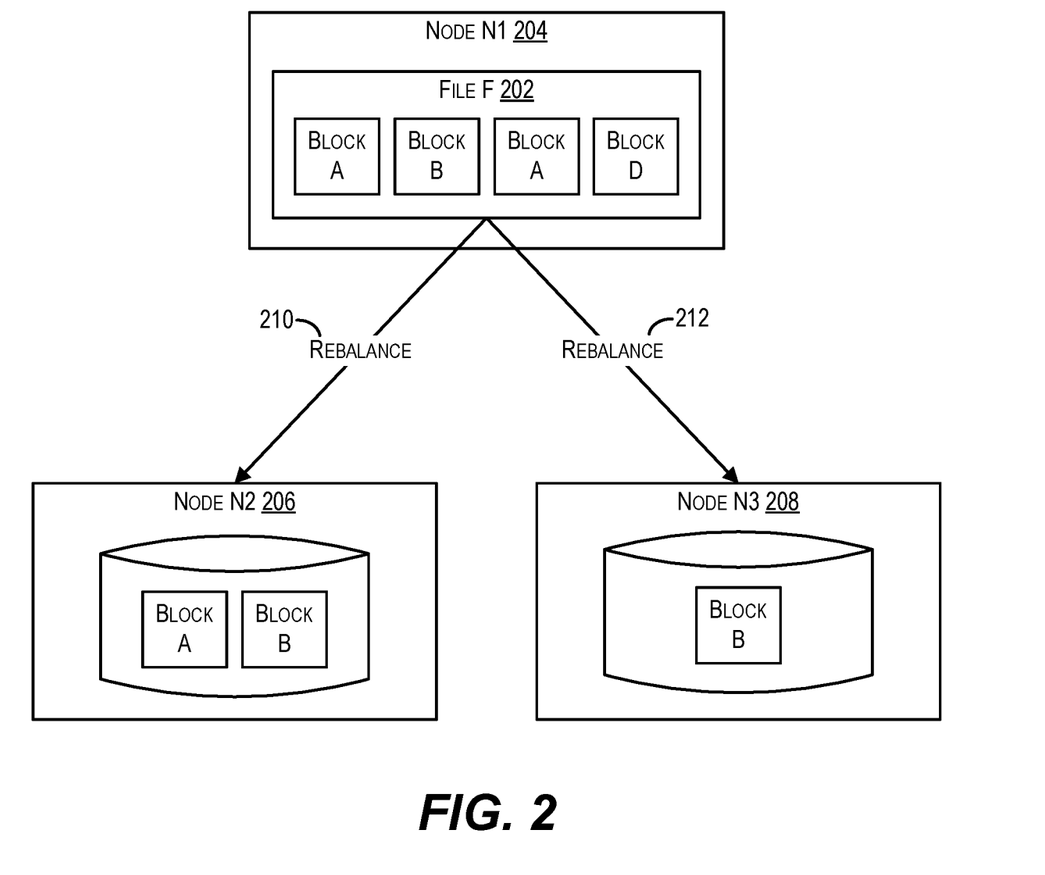
FIG. 2 depicts an example load balancing scenario.

For example, consider scenario 200 depicted in FIG. 2 where a file F (202) is resident on a first node N1 (204). File F consists of four total data blocks [A, B, A, C] and three distinct blocks [A, B, C], and thus blocks [A, B, C] are stored in a deduplicated manner on the local storage of N1 (note that the second instance of block A is stored as a reference). Assume that file F is to be moved from node N1 to another node for load balancing purposes, and there are two possible candidate nodes for receiving F—nodes N2 (206) and N3 (208). As shown, N2 has blocks A and B in its local storage (due overlap with some other files/storage objects already stored on N2), whereas N3 only has block B.

In this scenario, if the system is agnostic of what deduplicated data blocks are already present on nodes N2 and N3 (which is the case in existing implementations), the system may decide to rebalance file F from node N1 to node N3 based on, e.g., random selection or some other criteria unrelated to deduplication (shown via arrow 212). However, the creation of F on N3 requires the allocation of two new data blocks in the local storage of N3 in order to hold A and C. Thus, from the perspective of overall system storage utilization, this decision is suboptimal since the alternative of rebalancing F from N1 to N2 (shown via arrow 210) would only require the allocation of one new data block in the local storage of N2 to hold C.

Figure 3:
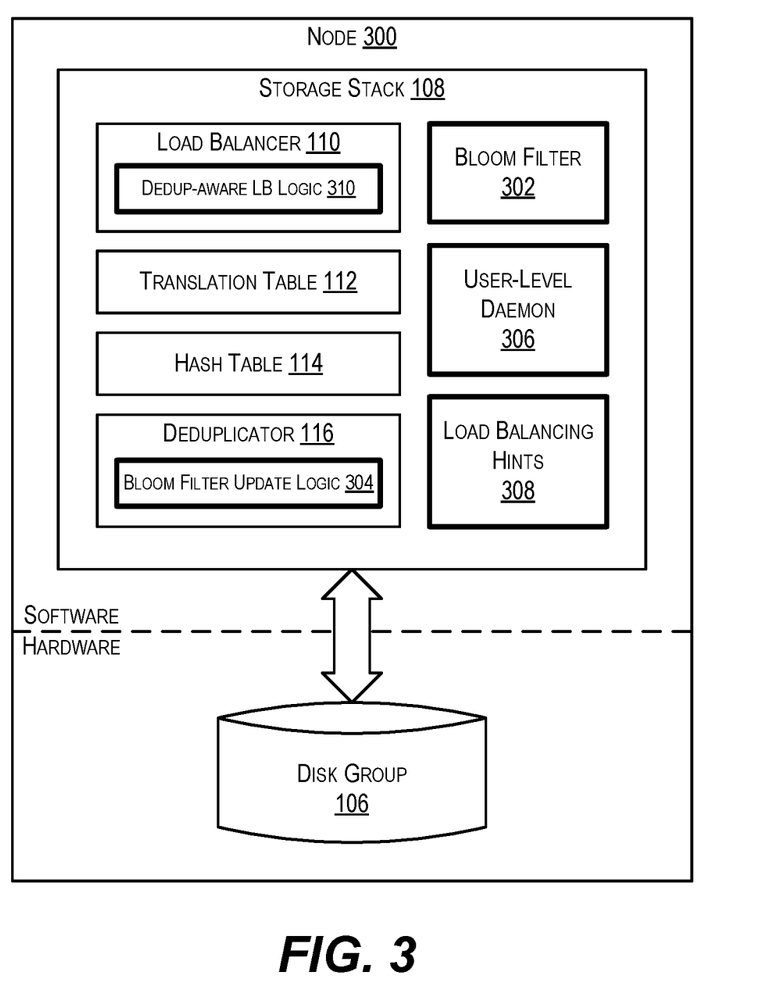
FIG. 3 depicts a storage node according to an embodiment.

To address this and other similar issues, FIG. 3 depicts an enhanced storage node 300 according to an embodiment. Node 300 may be used in place of each of nodes 102(1)-(N) shown in FIG. 1. As depicted in FIG. 3, node 300 includes similar load balancing and deduplication components as node 102, but also includes a bloom filter 302, bloom filter update logic 304 (within deduplicator 116), a user-level background process (i.e., daemon) 306, a load balancing hints data structure 308, and deduplication-aware load balancing logic 310 (within load balancer 110).

As known in the art, a bloom filter is a probabilistic data structure that is used to quickly test the presence of elements in a set. More specifically, a bloom filter supports (1) an "insert" function that takes as input an identifier of an element and inserts that element into the bloom filter's set, and (2) a "query" function that takes as input an element identifier and outputs a result indicating that the element is either definitely not in the set, or possibly in the set (according to some level of probabilistic certainty). For purposes of the present disclosure, it is also assumed that bloom filter 302 supports a "delete" function that takes as input an element identifier and deletes that element from the set. Examples of known bloom filter implementations that may be used to implement bloom filter 302 of FIG. 3 include a cuckoo filter and quotient filter.

At a high level, each time deduplicator 116 inserts a new entry into hash table 114 (corresponding to the allocation of a new data block on disk group 106) or deletes an existing entry from hash table 114 (corresponding to the freeing of an existing data block on disk group 106), bloom filter update logic 304 can cause an identifier of the new/deleted data block (e.g., the block's fingerprint or a subset of the fingerprint) to be inserted into or deleted from bloom filter 302 respectively. In this way, bloom filter update logic 304 can keep bloom filter 302 in sync with hash table 114, such that bloom filter 302 reflects the deduplicated data blocks that are present in disk group 106.

In addition, on a periodic basis (e.g., each time a scanner task scans the deduplicated data blocks on disk group 106 for statistics collection purposes), user-level daemon 306 can send out messages to the user-level daemons of all other nodes in the same distributed storage system requesting information regarding the deduplicated blocks that are present on those nodes. For example, in certain embodiments, user-level daemon 305 can send to each other daemon one request message per storage object stored in disk group 106, which includes the fingerprints of all of the deduplicated data blocks that are part of the storage object. In response to this request message, the receiving daemon can query the fingerprints included in the message against its local bloom filter and can return to user-level daemon 306 a total count of deduplicated blocks that are present/stored on the daemon's node.

Upon receiving the block count from each remote daemon, user-level daemon 306 can identify the node that has the highest deduplicated block count for the storage object. User-level daemon 306 can then store an identifier for this node, along with an identifier of the storage object, in load balancing hints data structure 308 as being the preferred target node for the object.

Finally, at the time of making a load balancing decision with respect to a particular storage object, load balancer 110 can use deduplication-aware load balancing logic 310 to evaluate load balancing hints 308 and to determine whether a node is identified there as being a preferred target node for the object. If so, load balancer 110 can cause the storage object to be relocated to that node. Since the preferred target node in hints data structure 308 is the node with the greatest number of deduplicated data blocks for the storage object, this ensures that the object is rebalanced in a manner that minimizes impact to the overall storage utilization of the system. If no hint exists for the object in load balancing hints data structure 308 (or if the preferred target node is no longer available), load balancer 110 can perform the load balancing operation based on whatever other criteria or logic is available to the module.

It should be appreciated that FIGS. 1 and 3 are illustrative and various modifications are possible. For example, although FIG. 3 specifically depicts a bloom filter for maintaining information regarding what distinct (i.e., deduplicated) data blocks are present or likely present in disk group 106 of node 300, it should be appreciated that other types of probabilistic data structures that provide the same functionality as a bloom filter may be used for this purpose. Further, the entities shown in these figures may be organized according to different arrangements or configurations and/or may include subcomponents or functions that are not specifically described. One of ordinary skill in the art will recognize other variations, modifications, and alternatives.

3. Bloom Filter Update

Figure 4:
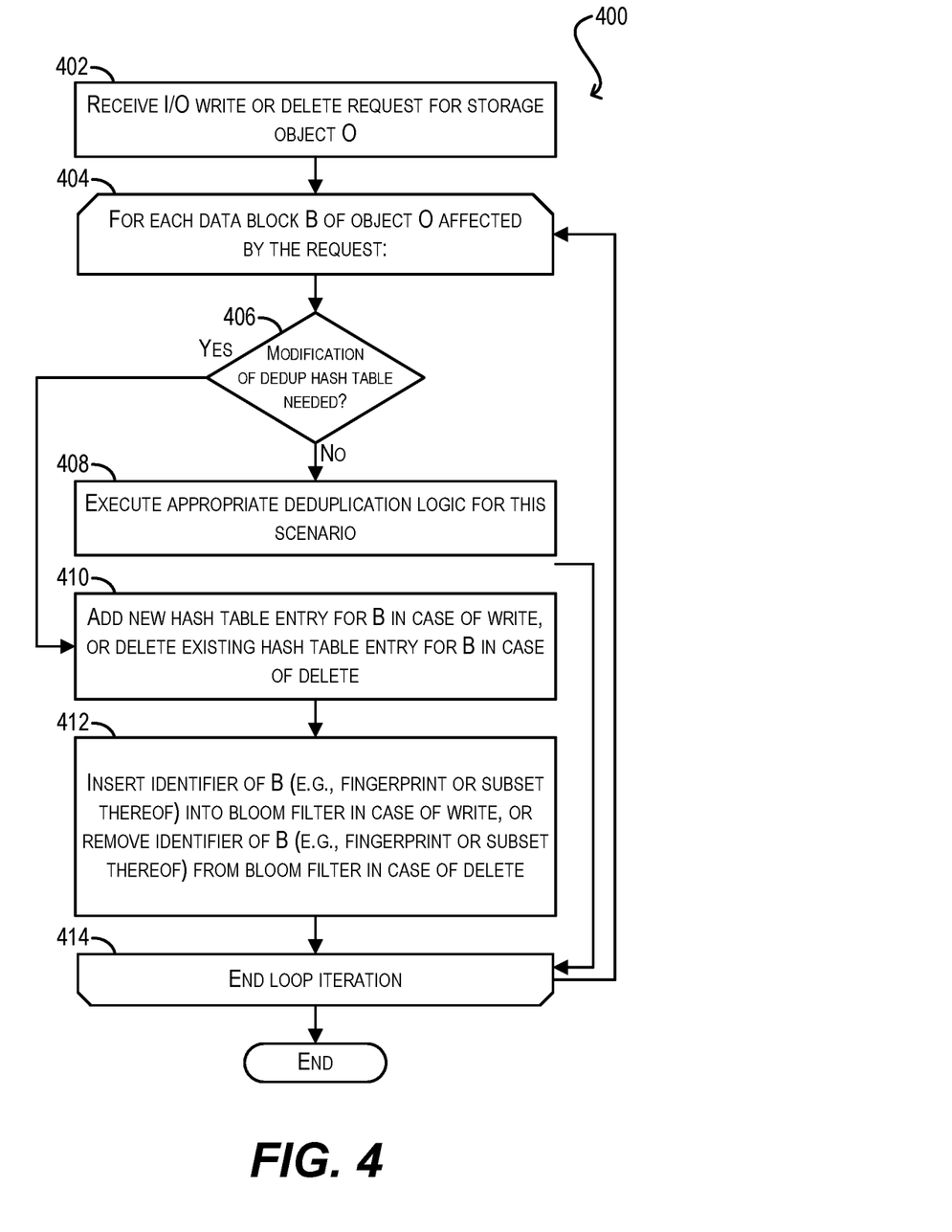
FIG. 4 depicts a flowchart for updating a bloom filter as part of a deduplication data path according to an embodiment.

FIG. 4 depicts a flowchart 400 that can be executed by deduplicator 116 (using logic 304) to update bloom filter 302 as part of its deduplication data path according to an embodiment.

Starting with steps 402 and 404, deduplicator 116 can receive an I/O write or delete request with respect to a storage object O and can enter a loop for each data block B of O that is affected by the request. Within this loop, deduplicator 116 can determine whether a new entry for B needs to be created in hash table 114 (i.e., whether a copy of B already exists on the local storage of the node) in the case of a write, or whether an existing entry for B needs to be removed from hash table 114 (i.e., whether there are any other storage objects currently referencing B) in the case of a delete (step 406). As mentioned previously, the former can involve calculating a fingerprint (e.g., hash) of the content of B and checking whether the fingerprint exists in hash table 114, and the latter can involve checking the reference count associated with B's existing hash table entry.

If deduplicator 116 determines that hash table 114 does not need to be modified at step 406, deduplicator 116 can execute appropriate deduplication logic for this scenario (step 408). In particular, deduplicator 116 can increase the reference count of B's existing hash table entry and create a new mapping in translation table 112 in the case of a write, or can decrement the reference count of B's existing hash table entry and delete B's existing translation table entry in the case of a delete. Deduplicator 116 can then return to the top of the loop to process the next data block.

However, if deduplicator 116 determines that hash table 114 does need to be modified at step 406, deduplicator 116 can execute appropriate deduplication logic for this scenario, which can include allocating new physical storage space for B and creating new hash table/translation table entries for B in the case of a write, or marking the physical offset for B in storage as free/empty and removing the existing hash table/translation table entries for B in the case of a delete (step 410). As part of this processing, deduplicator 116 can either insert an identifier of block B into bloom filter 302 (in conjunction with creating a new hash table entry) or delete an identifier of block B from bloom filter 302 (in conjunction with deleting an existing hash table entry), thereby keeping bloom filter 302 in sync with hash table 114 (step 412). The former can involve invoking the "insert" function of the bloom filter and passing the fingerprint of block B (or a subset thereof, such as the X least significant bits of the fingerprint) as input to the insert function. The latter can involve invoking the "delete" function of the bloom filter and passing the fingerprint of block B (or a subset thereof, such as the X least significant bits of the fingerprint) as input to the delete function.

Upon updating bloom filter 302 at step 412, the current loop iteration can end (step 414) and deduplicator 116 can return to the top of the loop to process the next data block. Once all data blocks have been processed, workflow 400 can terminate.

4. Deduplication Statistics Collection and Hint Generation

Figure 5:
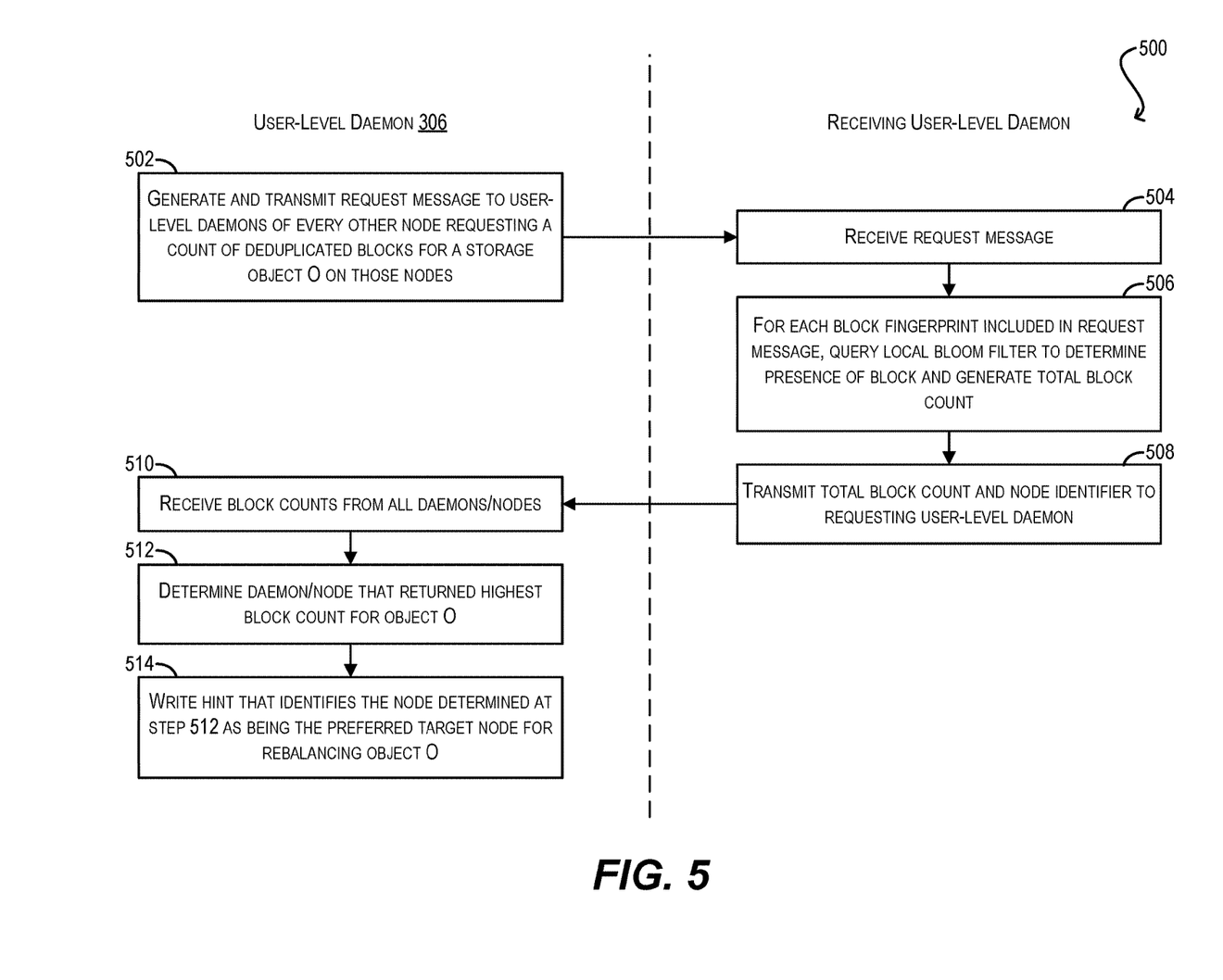
FIG. 5 depicts a flowchart for collecting deduplicated block statistics and updating a load balancing hints data structure according to an embodiment.

FIG. 5 depicts a flowchart 500 that can be executed by user-level daemon 306 for collecting deduplication block statistics from the daemons of other nodes and generating/updating load balancing hints data structure 308 according to an embodiment. User-level daemon 306 can execute flowchart 500 on a timed interval basis (e.g., once every X hours). In a particular embodiment, user-level daemon 306 can execute flowchart 500 in response to being invoked by a deduplication scanner task that is configured to periodically scan the storage objects stored on disk group 106 in order to generate local storage statistics (e.g., number of unique data blocks per object, number of data blocks that are compressed, etc.).

It should be noted that flowchart 500 illustrates the process of collecting deduplication block statistics and generating a load balancing hint for a single storage object; accordingly, user-level daemon 306 can repeat flowchart 500 for each storage object maintained in disk group 106.

Starting with step 502, user-level daemon 306 can generate and transmit a message to the user-level daemons of every other node in the distributed storage system requesting a count of the deduplicated blocks that are present on those nodes for a given storage object O. This request message can include the fingerprint (or a subset thereof) of each distinct data block that is part of object O. For example, in embodiments where deduplicator 116 only uses the X least significant bits of each fingerprint to add data blocks to bloom filter 302 as part of flowchart 400, the request message can include these X least significant bits per fingerprint (rather than the entirety of each fingerprint). Further, in certain embodiments, user-level daemon 302 may compress the fingerprints included in the request message (using, e.g., delta encoding or any other compression technique known in the art) in order to minimize the size of the request message.

At steps 504 and 506, each receiving user-level daemon can receive the request message and can query its local bloom filter in order to determine the number of deduplicated data blocks that are present on its node for storage object O. In various embodiments, step 506 can involve invoking the bloom filter's query function for each block fingerprint included in the request message and incrementing a counter each time the query function returns a result indicating that the block is likely to be present on the node. The receiving user-level daemon can then return this counter value (which represents the node's deduplicated block count for object O) to requesting user-level level daemon 306, along with a unique identifier of that node (step 508).

At steps 510 and 512, user-level daemon 306 can receive the block counts transmitted by each of the other user-level daemons and can determine the daemon that returned the highest block count. Finally, at step 514, user-level daemon 306 can update load balancing hints data structure 308 with a hint entry that includes an identifier of storage object O and the identifier of the node determined at block 512. This hint entry can record that the node identified by that node identifier is the preferred load balancing target node for storage object O.

5. Load Balancer Execution

Figure 6:
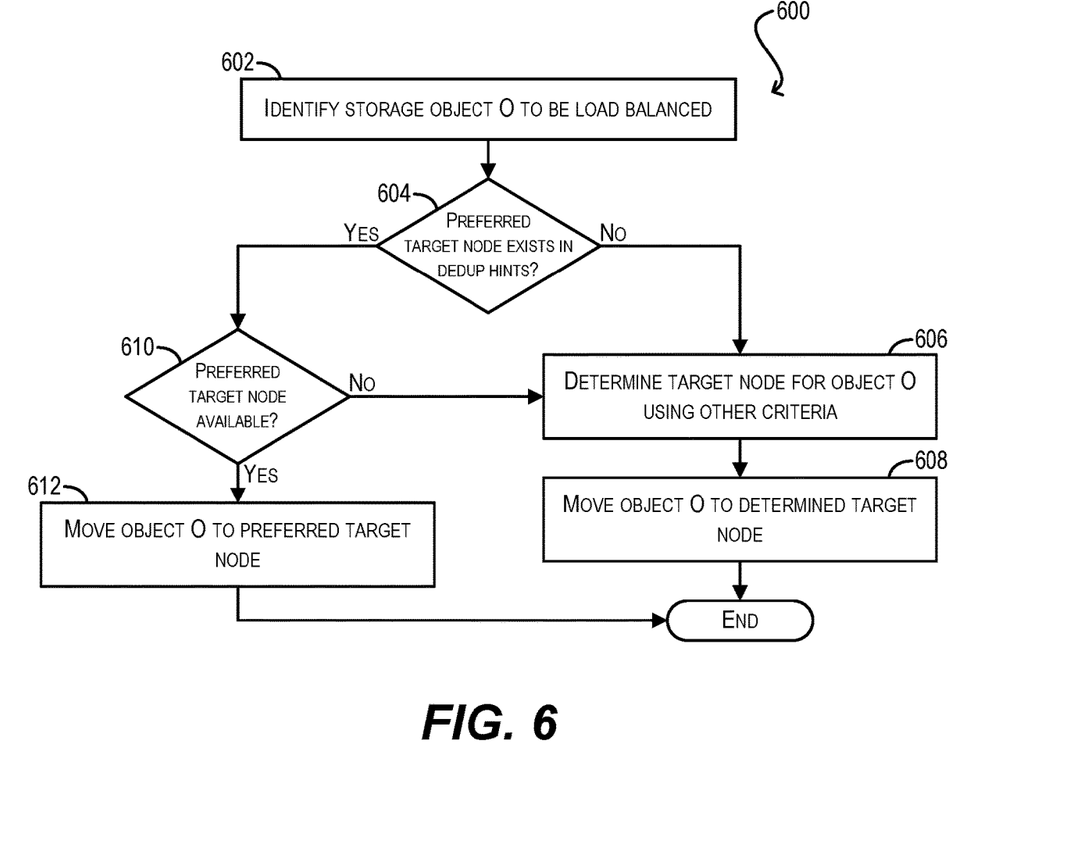
FIG. 6 depicts a flowchart for performing load balancing based on the load balancing hints according to an embodiment.

FIG. 6 depicts a flowchart 600 that can be executed by load balancer 110 (using logic 310) for carrying out a load balancing operation with respect to a given storage object using the deduplication hints that are generated/updated via flowchart 500 according to an embodiment.

At step 602, load balancer 110 can identify a storage object O to be rebalanced from the current node to another node in the distributed storage system. In response, load balancer 110 can examine deduplication hints data structure 308 and determine whether there is a hint there that identifies a preferred target node for object O (step 604).

If not, load balancer 110 can determine a target node for object O using other criteria (step 606), move object O to that determined target node (step 608), and flowchart 600 can end.

However, if there is a preferred target node identified for object O in deduplication hints data structure 308, load balancer 110 can check whether the preferred target node is available (i.e., is currently operational) (step 610). If the preferred target node is available, load balancer 110 can move object O to the preferred target node (step 612) and flowchart 600 can end. Otherwise load balancer 110 can determine a different target node based on other criteria and move object O per previously discussed steps 606 and 608.

Certain embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a general purpose computer system selectively activated or configured by program code stored in the computer system. In particular, various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments, and are presented to illustrate the flexibility and advantages of particular embodiments as defined by the following claims. Other arrangements, embodiments, implementations and equivalents can be employed without departing from the scope hereof as defined by the claims.

What is claimed is:

1. A method for enabling deduplication-aware load balancing in a distributed storage system comprising a plurality of nodes, the method comprising, for a storage object stored on a local storage component of a first node in the plurality of nodes:

transmitting, by a user-level background process running on the first node, a message to each other node in the plurality of nodes requesting a count of a total number of deduplicated data blocks of the storage object that are stored on a local storage component of said each other node, the message including identifiers for the deduplicated data blocks of the storage object;

receiving, by the user-level background process, the counts of deduplicated data blocks from the other nodes;

determining, by the user-level background process, a second node in the plurality of nodes that returned the highest count of deduplicated data blocks for the storage object;

updating, by the user-level background process, a data structure maintained on the first node with an entry that includes an identifier of the storage object and an identifier of the second node; and at a time of performing a load balancing operation with respect to the storage object:
retrieving the entry from the data structure;
determining whether the second node identified in the entry is available; and if the second node is available, moving the storage object from the first node to the second node.

2. The method of claim 1 wherein, upon, receiving the message, said each other node queries a probabilistic data structure local to the node using the identifiers in order to generate the count.

3. The method of claim 1 wherein the user-level background process performs the transmitting in response to being invoked by a deduplication scanner task that periodically collects statistics regarding a plurality of storage objects stored on the local storage component.

4. The method of claim 1 wherein the entry added to the data structure identifies the second node as a preferred target node for receiving the storage object during the load balancing operation.

5. The method of claim 1 further comprising:
receiving, by the first node, an I/O (Input/Output) request pertaining to a first storage object stored on the local storage component of the first node; and
for each data block of the first storage object affected by the I/O request:
determining whether the I/O request requires insertion of a new entry into a deduplication hash table associated with the local storage component or deletion of an existing entry from the deduplication hash table;
if the I/O request requires insertion of the new entry, adding an identifier of the data block into a probabilistic data structure associated with the local storage component, the probabilistic data structure maintaining information regarding deduplicated data blocks that are likely present in the local storage component; and
if the I/O request requires deletion of the existing entry, removing, by the node, the identifier of the data block from the probabilistic data structure.

6. The method of claim 5 wherein the identifier of the data block comprises a predefined number of least significant bits of a fingerprint calculated from the data block's content.

7. The method of claim 5 wherein the probabilistic data structure is a bloom filter.

8. The method claim 5 further comprising:
receiving, by the first node, a request from a third node in the plurality of nodes for a count of deduplicated data blocks for the first storage object that are stored in the local storage component of the first node;
in response to the request from the third node, querying the probabilistic data structure to generate the count; and
upon generating the count, transmitting the count to the third node.

9. A non-transitory computer readable storage medium having stored thereon program code executable by a first node in a distributed storage system comprising a plurality of nodes, the program code embodying a method for enabling deduplication-aware load balancing in the distributed storage system, the method comprising, for a storage object stored on a local storage component of the first node:
transmitting, by a user-level background process running on the first node, a message to each other node in the plurality of nodes requesting a count of a total number of deduplicated data blocks of the storage object that are stored on a local storage component of said each other node, the message including identifiers for the deduplicated data blocks of the storage object;
receiving, by the user-level background process, the counts of deduplicated data blocks from the other nodes;
determining, by the user-level background process, a second node in the plurality of nodes that returned the highest count of deduplicated data blocks for the storage object;
updating, by the user-level background process, a data structure maintained on the first node with an entry that includes an identifier of the storage object and an identifier of the second node; and
at a time of performing a load balancing operation with respect to the storage object:
retrieving the entry from the data structure;
determining whether the second node identified in the entry is available; and
if the second node is available, moving the storage object from the first node to the second node.

10. The non-transitory computer readable storage medium of claim 9 wherein, upon, receiving the message, said each other node queries a probabilistic data structure local to the node using the identifiers in order to generate the count.

11. The non-transitory computer readable storage medium of claim 9 wherein the user-level background process performs the transmitting in response to being invoked by a deduplication scanner task that periodically collects statistics regarding a plurality of storage objects stored on the local storage component.

12. The non-transitory computer readable storage medium of claim 9 wherein the entry added to the data structure identifies the second node as a preferred target node for receiving the storage object during the load balancing operation.

13. The non-transitory computer readable storage medium of claim 9 wherein the method further comprises:
receiving, by the first node, an I/O (Input/Output) request pertaining to a first storage object stored on the local storage component of the first node; and
for each data block of the first storage object affected by the I/O request:
determining whether the I/O request requires insertion of a new entry into a deduplication hash table associated with the local storage component or deletion of an existing entry from the deduplication hash table;
if the I/O request requires insertion of the new entry, adding an identifier of the data block into a probabilistic data structure associated with the local storage component, the probabilistic data structure maintaining information regarding deduplicated data blocks that are likely present in the local storage component; and
if the I/O request requires deletion of the existing entry, removing, by the node, the identifier of the data block from the probabilistic data structure.

14. The non-transitory computer readable storage medium of claim 13 wherein the identifier of the data block comprises a predefined number of least significant bits of a fingerprint calculated from the data block's content.

15. The non-transitory computer readable medium of claim 13 wherein the probabilistic data structure is a bloom filter.

16. The non-transitory computer readable storage medium of claim 13 wherein the method further comprises:
receiving, by the first node, a request from a third node in the plurality of nodes for a count of deduplicated data blocks for the first storage object that are stored in the local storage component of the first node;

in response to the request from the third node, querying the probabilistic data structure to generate the count; and upon generating the count, transmitting the count to the third node.

17. A computer system acting as a first node in a distributed storage system comprising a plurality of nodes, the computer system comprising:

a processor;

a local storage component;

a load balancing hint data structure; and a non-transitory computer readable medium having stored thereon program code that, when executed, causes the processor to, for a storage object stored on the local storage component:

transmit, via a user-level background process running on the computer system, a message to each other node in the plurality of nodes requesting a count of a total number of deduplicated data blocks of the storage object that are stored on a local storage component of said each other node, the message including identifiers for the deduplicated data blocks of the storage object;

receive, via the user-level background process, the counts of deduplicated data blocks from the other nodes;

determine, via the user-level background process, a second node in the plurality of nodes that returned the highest count of deduplicated data blocks for the storage object;

update, via the user-level background process, the load balancing hint data structure with an entry that includes an identifier of the storage object and an identifier of the second node; and at a time of performing a load balancing operation with respect to the storage object:

retrieve the entry from the load balancing hint data structure;

determine whether the second node identified in the entry is available; and if the second node is available, move the storage object from the first node to the second node.

18. The computer system of claim 17 wherein, upon receiving the message, said each other node queries a probabilistic data structure local to the node using the identifiers in order to generate the count.

19. The computer system of claim 17 wherein the transmitting is invoked by a deduplication scanner task that periodically collects statistics regarding a plurality of storage objects stored on the local storage component.

20. The computer system of claim 17 wherein the entry added to the load balancing hint data structure identifies the second node as a preferred target node for receiving the storage object during the load balancing operation.

21. The computer system of claim 17 wherein the program code further causes the processor to:

receive an I/O (Input/Output) request pertaining to a first storage object stored on the local storage component; and for each data block of the first storage object affected by the I/O request:

determine whether the I/O request requires insertion of a new entry into a deduplication hash table associated with the local storage component or deletion of an existing entry from the deduplication hash table;

if the I/O request requires insertion of the new entry, add an identifier of the data block into a probabilistic data structure associated with the local storage component, the probabilistic data structure maintaining information regarding deduplicated data blocks that are likely present in the local storage component; and if the I/O request requires deletion of the existing entry, remove, by the node, the identifier of the data block from the probabilistic data structure.

22. The computer system of claim 21 wherein the identifier of the data block comprises a predefined number of least significant bits of a fingerprint calculated from the data block's content.

23. The computer system of claim 21 wherein the probabilistic data structure is a bloom filter.

24. The computer system of claim 21 wherein the program code further causes the processor to:

receive a request from a third node in the plurality of nodes for a count of deduplicated data blocks for the first storage object that are stored in the local storage component of the first node;

in response to the request from the third node, query the probabilistic data structure to generate the count; and upon generating the count, transmit the count to the third node.

25. A method for enabling deduplication-aware load balancing in a distributed storage system comprising a plurality of nodes, the method comprising:

receiving, by a first node of the distribute storage system, an I/O (Input/Output) request pertaining to a storage object stored on a local storage component of the first node;

for each data block of the storage object affected by the I/O request:

determining whether the I/O request requires insertion of a new entry into a deduplication hash table associated with the local storage component or deletion of an existing entry from the deduplication hash table;

if the I/O request requires insertion of the new entry, adding an identifier of the data block into a probabilistic data structure associated with the local storage component, the probabilistic data structure maintaining information regarding deduplicated data blocks that are likely present in the local storage component; and if the I/O request requires deletion of the existing entry, removing, by the node, the identifier of the data block from the probabilistic data structure;

transmitting, by a user-level background process running on the first node, a message to each other node in the plurality of nodes requesting a count of deduplicated data blocks of the storage object that are stored on a local storage component of said each other node, the message including identifiers for the deduplicated data blocks of the storage object;

receiving, by the user-level background process, the counts of deduplicated data blocks from the other nodes;

determining, by the user-level background process, a second node in the plurality of nodes that returned the highest count of deduplicated data blocks for the storage object; and updating, by the user-level background process, a data structure maintained on the first node with an entry that includes an identifier of the storage object and an identifier of the second node.

26. A non-transitory computer readable storage medium having stored thereon program code executable by a first node in a distributed storage system comprising a plurality of nodes, the program code embodying a method for enabling deduplication-aware load balancing in the distributed storage system, the method comprising:
- receiving an I/O (Input/Output) request pertaining to a storage object stored on the local storage component of the first node;
- for each data block of the storage object affected by the I/O request:
  - determining whether the I/O request requires insertion of a new entry into a deduplication hash table associated with the local storage component or deletion of an existing entry from the deduplication hash table;
  - if the I/O request requires insertion of the new entry, adding an identifier of the data block into a probabilistic data structure associated with the local storage component, the probabilistic data structure maintaining information regarding deduplicated data blocks that are likely present in the local storage component; and
  - if the I/O request requires deletion of the existing entry, removing, by the node, the identifier of the data block from the probabilistic data structure;
- transmitting, by a user-level background process running on the first node, a message to each other node in the plurality of nodes requesting a count of deduplicated data blocks of the storage object that are stored on a local storage component of said each other node, the message including identifiers for the deduplicated data blocks of the storage object;
- receiving, by the user-level background process, the counts of deduplicated data blocks from the other nodes;
- determining, by the user-level background process, a second node in the plurality of nodes that returned the highest count of deduplicated data blocks for the storage object; and
- updating, by the user-level background process, a data structure maintained on the first node with an entry that includes an identifier of the storage object and an identifier of the second node.

27. A computer system acting as a first node in a distributed storage system comprising a plurality of nodes, the computer system comprising:
- a processor;
- a local storage component;
- a load balancing hint data structure; and
- a non-transitory computer readable medium having stored thereon program code that, when executed, causes the processor to:
  - receive an I/O (Input/Output) request pertaining to a storage object stored on the local storage component;
  - for each data block of the storage object affected by the I/O request:
    - determine whether the I/O request requires insertion of a new entry into a deduplication hash table associated with the local storage component or deletion of an existing entry from the deduplication hash table;
    - if the I/O request requires insertion of the new entry, add an identifier of the data block into a probabilistic data structure associated with the local storage component, the probabilistic data structure maintaining information regarding deduplicated data blocks that are likely present in the local storage component; and
    - if the I/O request requires deletion of the existing entry, remove, by the node, the identifier of the data block from the probabilistic data structure;
  - transmit, via a user-level background process running on the computer system, a message to each other node in the plurality of nodes requesting a count of deduplicated data blocks of the storage object that are stored on a local storage component of said each other node, the message including identifiers for the deduplicated data blocks of the storage object;
  - receive, via the user-level background process, the counts of deduplicated data blocks from the other nodes;
  - determine, via the user-level background process, a second node in the plurality of nodes that returned the highest count of deduplicated data blocks for the storage object; and
  - update, via the user-level background process, the load balancing hint data structure with an entry that includes an identifier of the storage object and an identifier of the second node.

* * * * *